United States Patent Office 3,423,177
Patented Jan. 21, 1969

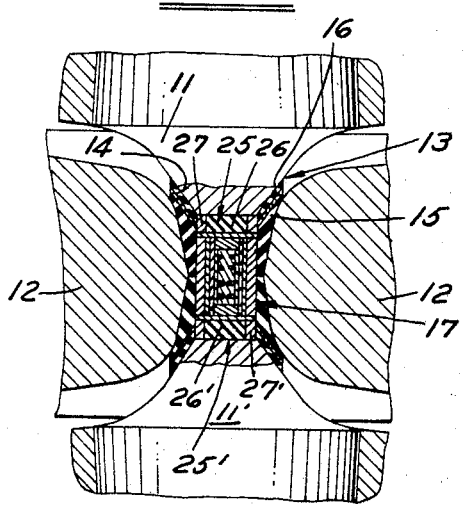

3,423,177
PROCESS FOR GROWING DIAMOND ON A DIAMOND SEED CRYSTAL
Harold P. Bovenkerk, Madison Heights, Mich., assignor to General Electric Company, a corporation of New York
Filed Dec. 27, 1966, Ser. No. 604,792
U.S. Cl. 23—209.1                4 Claims
Int. Cl. C01b 31/06

ABSTRACT OF THE DISCLOSURE

An integrally formed diamond envelope is grown on all faces of a diamond seed crystal by placing the diamond seed within nondiamond carbon in a high temperature-pressure apparatus, in the presence of a catalyst for diamond growth, the seed crystal being connected to and spaced from the catalyst by an open channel in the nondiamond carbon. The seed crystal, carbon and catalyst are then subjected to a combined pressure and temperature above the graphite-to-diamond equilibrium line on the phase diagram of carbon.

Background of the invention

This invention relates to a process for growing diamond on a seed diamond to produce large single diamond crystals.

A process for converting nondiamond carbon to diamond is disclosed in U.S. Patent 2,947,610, Hall et al., and in U.S. Patent 2,947,609, Strong. The processes includes subjecting carbonaceous material and a catalyst to pressures and temperatures above the graphite-diamond equilibrium line on the phase diagram of carbon. Several methods have heretofore been suggested for growing larger diamonds from seed diamonds by utilizing modifications of the high-temperature, high-pressure techniques disclosed in the aforesaid Hall et al., and Strong patents. However, such methods have encountered difficulty in producing uniform growth on all faces of the seed diamond.

Summary of the invention

I have now found that diamond may be uniformly grown on all faces of a diamond crystal by spacing the diamond seed away from the catalyst along an open channel in the nondiamond carbonaceous material. The open channel accomplishes a twofold purpose—it prevents direct contact of catalyst and carbonaceous material, which contact has been found to block diamond growth along the contacting surface, and it provides a passageway for supply of molten catalyst to the diamond seed as the diamond grows.

Brief description of the drawing

The invention will be more clearly understood from the following description taken in connection with the accompanying drawings in which:

FIGURE 1 is an elevational view, partly in section, of the central portion of a high-pressure, high-temperature apparatus suitable for use in the practice of this invention;

FIGURE 2 is an enlarged cross-sectional view of the reaction vessel shown in FIG. 1 illustrating one embodiment of this invention;

FIGURE 3 is an enlarged detail view of a portion of the reaction vessel of FIG. 2;

FIGURE 4 is similar to FIG. 3 but illustrates the changes which occur after application of heat and pressure; and FIGURE 5 is a cross-sectional view of a reaction vessel illustrating a second embodiment of the invention.

Description of the preferred embodiment

A suitable apparatus for carrying out the present invention is shown in FIG. 1. This apparatus is more fully disclosed in my U.S. Patent 3,031,269 which is hereby incorporated by reference. Referring to FIG. 1 of the drawings of the present application, the apparatus includes a pair of punches 11 and 11¹ and an annular belt or die 12. Between each punch 11 and 11¹ and die 12 there is included a gasket assembly 13 comprising a pair of thermally insulating and electrically nonconducting stone gaskets 14 and 15 and an intermediate metallic gasket 16.

Reaction vessel 17, shown in detail in FIG. 2, is of the indirect-heating type and includes a hollow pyrophyllite cylinder 18, a concentrically positioned graphite electrical resistance heater tube 19 within cylinder 18 and a concentrically positioned alumina liner or cylinder 20 within tube 19. Graphite rod 21, from which diamonds are grown, is placed in a diamond catalyst metal tube 22 positioned centrally within alumina liner 20. The ends of the catalyst metal tube 22 are fitted with a pair of alumina plugs 23 and 23¹ to close the ends of the tube 22. Electrically conductive metallic end discs 24 and 24¹ are used at each end of cylinder 18 to provide electrical connection to heater tube 19. Adjacent end discs 24 and 24¹ is an end cap assembly 25 and 25¹ (FIG. 1), each comprising a pyrophyllite cylinder or disc 26 and 26¹ surrounded by an electrical conducting ring 27 and 27¹.

Motion of one punch toward the other compresses the gasket assemblies and reaction vessel, thereby raising the pressure within the reaction vessel to the appropriate level. Electrical current is provided from a source (not shown) to flow through punches 11 and 11¹, end discs 24 and 24¹ and graphite resistance heater tube 19 to indirectly raise the temperature of the graphite in the reaction vessel 17.

In the practice of the present invention, a number of blind holes or channels 30 are drilled a short distance radially inward from the outer diameter of the graphite rod 21. As can be most clearly seen from FIG. 3, a seed diamond 31 is placed at the inner radial end of each of channels 30 a distance of one or more crystal diameters from the peripheral surface of the uncompressed graphite rod 21. Upon raising the temperature and pressure of the reaction vessel to above the graphite-to-diamond equilibrium line on the phase diagram of carbon, diamond will uniformly grow on all faces of the seed diamond crystal. It has been surprisingly found that channels 30 are not completely closed by the flow of graphite at the very high temperatures and pressures at which diamond growth occurs but rather a remnant channel remains. At diamond growth temperatures and pressures, catalyst tube 22 serves as a reservoir of molten catalyst which migrates through the remnants of channels 30 and coats the seed diamond. As shown in FIG. 4, as the seed diamond grows larger with new diamond growth 32, the catalyst film 33 tends to thin out. Normally, the growth stops when the film thins out below a critical thickness. However, the stabilized source of catalyst within alumina tube 20 automatically replenishes and maintains the film through connecting wick 34, the catalyst-filled remnant of channel 30.

FIG. 5 illustrates an alternative embodiment of the invention wherein the catalyst and graphite are arranged within the reaction vessel in alternate laminar relationship.. The production of diamonds by the utilizatoin of such a laminar arrangement is fully described in my U.S. Patent 2,992,900 which is hereby incorporated by reference. As can be seen in FIG. 5, the catalyst and diamond are arranged in alternate laminae of catalyst discs 35 and graphite discs 36. Spaced channels 37 are drilled axially into the lower surface of graphite discs 36 in the same fashion as illustrated above in the case of the radial channels 30 of FIGS. 1–4. It is preferable that the reaction vessel be oriented so that the seed diamonds 38 are located in a channel above the top surface of catalyst discs 35, since the diamonds would tend to float through the catalyst discs when they become molten if the channel connecting diamond and catalyst were to extend downward from the bottom of the catalyst.

Catalysts useful in the practice of this invention are those generally useful in the production of diamonds, as disclosed in U.S. Patents 2,947,610, Hall et al., and 2,947,609, Strong. These catalyst materials are metals of Group VIII of the periodic Table of Elements, plus chromium, manganese and tantalum. The catalysts may be used in elemental form, as alloys containing one or more of the indicated catalysts, as mixtures of catalysts and noncatalyst metals, or as compounds of the catalyst metals which decompose to metallic form at the reaction pressures and temperatures.

In carrying out the invention, the pressure and temperature should be raised to the diamond stable or diamond forming region of the phase diagram of carbon for times varying from a few seconds to several minutes or even longer, depending on the particular system employed and the degree of diamond growth desired. It is desirable to practice the invention at pressures and temperatures at which some spontaneous nucleation and growth of new diamond crystals occurs at regions where there are no diamond seeds, since the best quality seeded growth takes place under these conditions. The minimum temperatures and pressures for spontaneous diamond nucleation are of the order of about 1200° C. and about 42 kilobars for alloy metals and 56 kilobars for single metals. These pressures are based upon a calibration procedure which is related to known electrical resistance changes of various metals at room temperature under known pressures, as described and illustrated in the aforementioned U.S. Patents 2,947,610 and 2,947,609 and as modified by correcting the calibration as described in "Calibration Techniques in Ultra Pressures," F. P. Bundy, Journal of Engineering for Industry, May 1961, Transactions of the ASME, Series B.

The following examples illustrate the practice of the invention:

EXAMPLE 1

A reaction vessel was assembled as shown in FIGS. 1 and 2 using a Ni metal catalyst tube and an extruded graphite rod .80" long and .28" in diameter. The graphite rod has about 20 holes of about .015" in diameter drilled radially inward from the outer diameter to a depth of about .10". The holes or channels were in roughly equally spaced vertical rows of 7 holes per row. Diamond seed crystals of 40 mesh or 400 microns in size were placed in the inner radial extremities of each channel. The assembled reaction vessel was then subjected to 56 kilobars pressure and 1440° C. temperature for a period of 60 minutes, holding pressure and temperature constant. The temperature then the pressure were reduced, and the grown diamond crystals recovered. The diamonds were covered with a thin Ni catalyst film which was removed. The cleaned diamonds were of 800 to 1200 microns in size or 2 to 3 times the linear size or 8 to 25 times the weight of the initial diamond seeds. The seed crystals were covered on all faces by a continuous film of new diamond of uniform thickness.

EXAMPLE 2

A reaction vessel was assembled as shown in FIG. 5. Discs of a 35% Ni 65% Fe alloy .010" thick and .250" diameter were in alternate structure with discs of graphite .150" thick and the same diameter. Holes of .015" and .030" diameter were drilled halfway into the graphite discs in a spaced random pattern with approximately five holes per disc. Previously synthesized seed diamonds and natural diamond crystals 400 and 800 microns in diameter were pressed into the bottoms of the drilled holes. The alternate discs of graphite and catalyst metal were assembled into the reaction vessel with the seed diamonds at the top of the holes as shown in FIG. 5. The assembled reaction vessel was then subjected to 50 kilobars pressure at about 1280° C. for 30 minutes. The temperature then the pressure were reduced and the diamond crystals were recovered. The seed diamonds had grown with a uniform layer of new diamond growth averaging 150 microns on all sides so that seeds now were mostly 700 to 1100 microns in length. New diamond crystals had spontaneously nucleated and grown to sizes ranging from 200 to 400 microns in maximum dimension.

The present process provides a diamond crystal having a uniform integrally formed diamond envelope surrounding all surfaces of the diamond seed crystal. Using the present process, seed diamonds have been grown consistently to sizes 2 to 3 times their initial linear size before the diamond grows to a size interfering with the reservoir of catalyst. The new growth on the diamond seed is continuous in nature but a line of impurity makes it possible in some cases to distinguish the boundary between the original seed and the beginning of the new growth. Diamond growth on seeds has been accomplished by other high-pressure, high-temperature techniques, but such methods do not produce a continuous coverage of new growth free from gross defects. Generally other such seed growth techniques, such as when the seed is placed in direct contact with the catalyst metal, suffer in that the face of the seed in contact with the metal does not grow. This gives a diamond of nonuniform structure which is more easily fractured by mechanical or thermal shock— hence, of less utility in diamond tools.

Seed diamond has also been grown at pressures and temperatures where diamond is metastable, i.e., below the graphite-diamond equilibrium line on the phase diagram of carbon. Such processes are, however, limited to extremely thin growth on fine diamond powder, and hence do not produce a product of significant added utility over the starting material.

Seed diamonds pressed in a random mixture containing catalyst metal mixed with graphite rely on a random process for distribution of diamond seed and on a random or uncontrolled process for forming a suitable metal film over the seed diamond so it can grow. The improvements in the present process include both controlled growth of the diamond and efficient use of the reaction volume of the high-pressure apparatus.

I claim:

1. A process of growing diamond crystals from a seed diamond, a catalyst for diamond growth and nondiamond carbon comprising:
    positioning the nondiamond carbon in contiguous relationship to the catalyst,
    placing a diamond seed within the nondiamond carbon, said diamond seed being connected by and spaced from the catalyst by an open channel in the nondiamond carbon,
    subjecting said combination of nondiamond carbon, catalyst and diamond seed to a combined pressure and temperature above the graphite-to-diamond equilibrium line on the phase diagram of carbon.

2. The process of claim 1 in which the nondiamond carbon is in the form of a rod and the catalyst is in the form of a tube, the carbon rod being placed within the catalyst tube, the carbon rod having a series of radial channels therein, at the inner radial end of each of which is placed the diamond seed.

3. The process of claim 1 in which the nondiamond carbon and the catalyst are in the form of a plurality of discs, the carbon and catalyst discs being arranged in alternate laminar relationship, each of the carbon discs having a series of holes extending axially into the discs from the lower ends thereof, at the end of each of which is placed the diamond seed.

4. The process of claim 1 in which the nondiamond carbon, catalyst and diamond seed are subjected to a combined pressure and temperature at which spontaneous nucleation of new diamond occurs, said pressure being above 42 kilobars for an alloy metal catalyst and above 56 kilobars for a single metal catalyst, and said temperature being above 1200° C.

References Cited

UNITED STATES PATENTS

| | | | |
|---|---|---|---|
| 2,992,900 | 7/1961 | Bovenkerk | 23—209.1 |
| 3,031,269 | 4/1962 | Bovenkerk | 23—209.1 |
| 3,297,407 | 1/1967 | Wentorf | 23—209.1 |
| 3,346,102 | 10/1967 | Strong | 23—209.1 X |

EDWARD J. MEROS, *Primary Examiner.*

U.S. Cl. X.R.

23—301